(12) United States Patent
Matsushita et al.

(10) Patent No.: US 8,565,051 B2
(45) Date of Patent: Oct. 22, 2013

(54) STORAGE SYSTEM AND METHOD FOR GENERATING FILE SYSTEM IN THE STORAGE SYSTEM

(75) Inventors: Takaki Matsushita, Yokohama (JP); Toshihiro Kato, Tokyo (JP); Akinobu Watanabe, Kawasaki (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 169 days.

(21) Appl. No.: 12/956,129

(22) Filed: Nov. 30, 2010

(65) Prior Publication Data

US 2011/0235481 A1    Sep. 29, 2011

(30) Foreign Application Priority Data

Mar. 25, 2010   (JP) ................................. 2010-070235

(51) Int. Cl.
*G11B 21/08*   (2006.01)
(52) U.S. Cl.
USPC .............. 369/30.05; 369/30.19; 707/999.107; 707/999.101; 707/999.102
(58) Field of Classification Search
USPC ........... 369/30.06, 30.05, 30.19, 83, 84, 53.2, 369/53.37, 53.41; 707/999.107, 999.101, 707/999.102, 822, 823, 827; 719/319
See application file for complete search history.

(56) References Cited

U.S. PATENT DOCUMENTS

| | | | | |
|---|---|---|---|---|
| 5,276,867 A | * | 1/1994 | Kenley et al. ......................... 1/1 |
| 5,564,011 A | * | 10/1996 | Yammine et al. ............... 714/15 |
| 5,897,645 A | * | 4/1999 | Watters .......................... 715/210 |
| 5,933,839 A | * | 8/1999 | Hasegawa et al. ............ 707/824 |
| 2005/0007898 A1 | | 1/2005 | Maeda |
| 2005/0210067 A1 | * | 9/2005 | Nakatani et al. ........... 707/104.1 |
| 2005/0232589 A1 | * | 10/2005 | Kimura et al. ................... 386/69 |
| 2005/0267916 A1 | * | 12/2005 | Tone et al. ..................... 707/200 |
| 2006/0004879 A1 | * | 1/2006 | Tone .............................. 707/200 |
| 2007/0136282 A1 | * | 6/2007 | Takashima ........................ 707/6 |
| 2007/0223879 A1 | | 9/2007 | Ito et al. |
| 2009/0109823 A1 | | 4/2009 | Joukov |
| 2009/0313621 A1 | * | 12/2009 | Dewa ................................ 718/1 |
| 2011/0055629 A1 | * | 3/2011 | Lee et al. ......................... 714/15 |
| 2012/0084262 A1 | * | 4/2012 | Dwarampudi et al. ....... 707/667 |
| 2012/0099408 A1 | * | 4/2012 | Hamada et al. ......... 707/999.107 |

FOREIGN PATENT DOCUMENTS

| | | |
|---|---|---|
| CN | 101030223 | 9/2007 |
| JP | 2005-31930 | 2/2005 |

OTHER PUBLICATIONS

Chinese Office Action for Application No. 201010573272.2, issued on Sep. 13, 2012.

* cited by examiner

*Primary Examiner* — Tan X Dinh
(74) *Attorney, Agent, or Firm* — Antonelli, Terry, Stout & Kraus, LLP.

(57) ABSTRACT

A storage system, which includes a plurality of ODDs, is configured so as to easily retrieving a predetermined file from files stored in a plurality of optical discs. The storage system includes a storage controller connected to the plurality of ODDs and a nonvolatile memory via a storage bus. Each of the optical discs mounted in the ODDs has a file system representing the storage structure of files stored in the optical disc. The nonvolatile memory stores copies of the file systems of all the mounted optical discs. A user refers to the file system stored in the nonvolatile memory to retrieve a file. When an optical disc is ejected, the optical disc stores copies of the file systems of the other optical discs and is ejected. If the optical disc is installed into another storage system, the user can search for a file stored in the other optical discs.

6 Claims, 5 Drawing Sheets

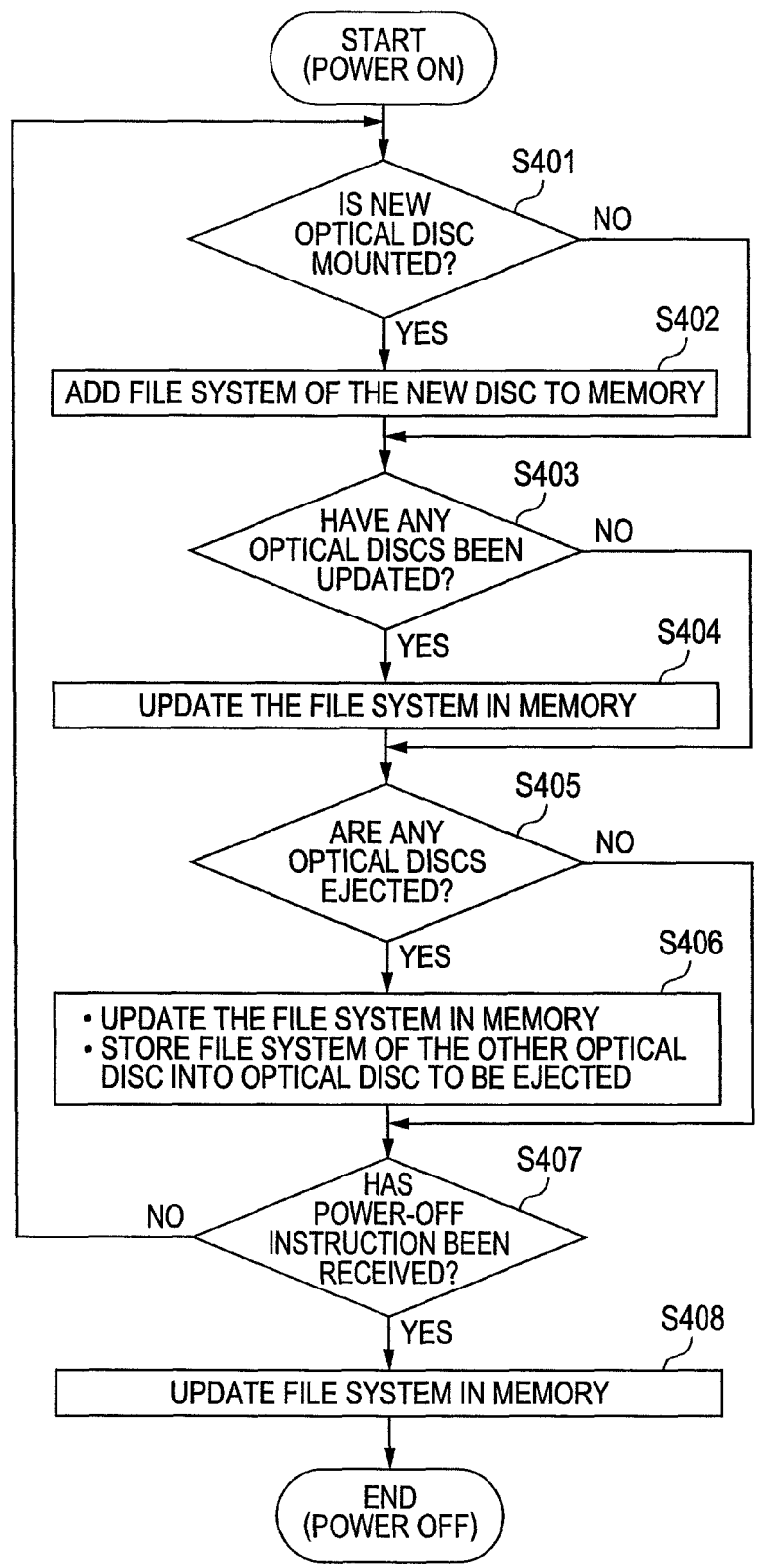

STORAGE SYSTEM AND METHOD FOR GENERATING FILE SYSTEM IN THE STORAGE SYSTEM

INCORPORATION BY REFERENCE

This application relates to and claims priority from Japanese Patent Application No. 2010-070235 filed on Mar. 25, 2010, the entire disclosure of which is incorporated herein by reference.

BACKGROUND OF THE INVENTION (1) Field of the Invention

The present invention relates to a storage system and a method for generating a file system in the storage system, and in particular, to a storage system facilitating retrieval of files and a method for generating a file system in the storage system.

(2) Description of the Related Art

With the evolution in storage systems, some have been developed that include a plurality of recording medium drives used to record and reproduce data on a recording medium, such as an optical disc, for the purpose of performing sophisticated information processing. Such systems use a plurality of removable recording media, and therefore are sometimes referred to as "changer" or "library system".

Japanese Patent Application Laid-Open No. 2005-31930 discloses a technique for improving response of a library system including a library accommodating a plurality of optical recording media, a cassette holding the plurality of optical recording media, and recording/reproducing drives.

SUMMARY OF THE INVENTION

Generally, many storage systems as described above store enormous numbers of information files. Thus, it tends to be difficult for a user to search such a storage system for a necessary file. Especially in the case of storage systems utilizing a removable recording medium, such as an optical disc, it sometimes happens that the recording medium with a user's necessary files stored is removed from the storage system, which brings the recording medium into a so-called off-line mode. This makes file retrieval more difficult. Even if, fortunately, the file can be found, the time required for a user to complete the retrieval operations may be very long.

The present invention has been made in view of the above-described problems and provides a storage system facilitating retrieval of a file and a method for generating a file system in the storage system.

In order to solve the problem, an embodiment of the present invention is directed to a storage system including a plurality of recording medium drives, wherein the recording medium drives store file systems on recording media mounted therein, the file system representing a storage structure of files stored at least on the recording media, and the storage system includes virtual file systems based on copies of all the file systems stored in the recording media mounted in the recording medium drives.

Furthermore, the embodiment of the present invention is also directed to a method for generating a file system for a storage system including a plurality of recording medium drives. The method includes the steps of: (a) determining whether any of recording media mounted in the recording medium drives are recording media that are mounted in the storage system for the first time; (b) if it is determined that any of the recording media are recording media that are mounted in the storage system for the first time as a result of the determination in step (a), firstly reading out file systems stored in the firstly-mounted recording media and storing the file systems in a memory unit; (c) determining whether any of the recording media mounted in the recording medium drives have been updated; (d) if it is determined that any of the recording media mounted in the recording medium drives have been updated as a result of the determination in step (c), secondly reading out file systems associated with the updated recording media from the file systems stored in the updated recording media, and updating the memory unit to store the file systems in the memory unit; (e) determining whether any of the recording media mounted in the recording medium drives have been instructed to eject from the storage system; and (f) if it is determined that any of the recording media mounted in the recording medium drives have been instructed to eject from the storage system as a result of the determination in step (e), thirdly reading out file systems associated with the recording media to be ejected from the file systems stored in the recording media to be ejected and updating the memory unit to store the file systems in the memory unit, while reading out file systems associated with the recording media other than the recording media to be ejected from the file systems stored in the memory unit and updating the recording media to be ejected to store the file systems.

According to the present invention, it is possible to provide a storage system facilitating retrieval of a file and a method for generating a file system in the storage system, thereby improving operability of the storage system.

BRIEF DESCRIPTION OF THE DRAWINGS

These and other features, objects and advantages of the present invention will become more apparent from the following description when taken in conjunction with the accompanying drawings wherein:

FIG. 4 is a flow chart showing the method for generating a file system according to the embodiment of the present invention.

DETAILED DESCRIPTION OF THE EMBODIMENT

An embodiment of the present invention will now be described with reference to the accompanying drawings.

Figure 1:
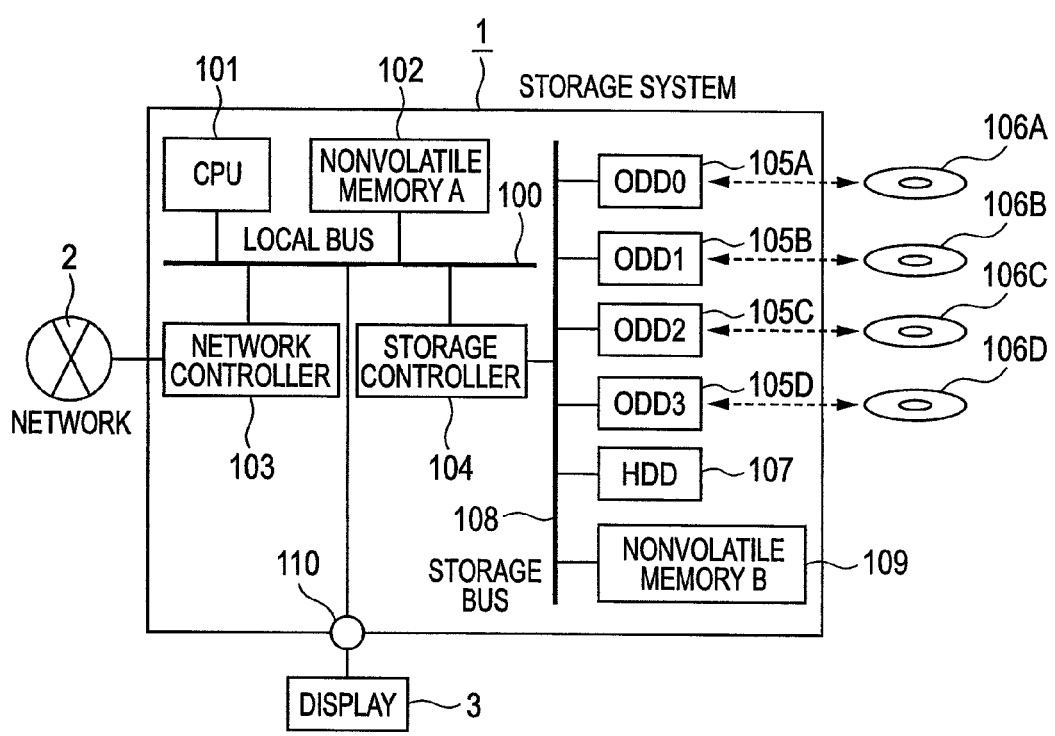
FIG. 1 is a block diagram of the storage system according town embodiment of the present invention.

FIG. 1 is a block diagram of the storage system according to the embodiment of the present invention.

A storage system 1 includes a CPU (Central Processing Unit) 101 that controls operations of the entire storage system.

The CPU 101 controls a network controller 103 via a local bus 100 to download data and programs supplied from other storage systems (not shown) connected to a network 2. The downloaded data and programs are stored in, for example, a HDD (Hard Disc Drive) 107 via the network controller 103, the local bus 100, a nonvolatile memory 102, a storage controller 104 and a storage bus 108.

Furthermore, the CPU 101 temporarily stores data, which is input by a user of the storage system 1 by using, for example, a mouse and keyboard (not shown), in the nonvolatile memory 102 and then stores the data in the HDD 107 under instructions from the user.

The data and programs stored in the HDD 107 are transferred to any one of or any plurality of ODDs (Optical disc Drives) 0 to 3 (105A to 105D) in response to instructions that are input by a user through the CPU 101. The transferred data and programs are encrypted, if needed, in the ODDs (Optical disc Drives) 0 to 3 (105A to 105D) based on IDs (Identifications), such as a device key, stored in the nonvolatile memory 102, and are stored on optical discs 0 to 3 (106A to 106D) respectively mounted in the drives. After the data and programs are stored in the optical discs 0 to 3 (106A to 106D), the data and programs in the HDD 107 can be deleted as required. As is well known, the optical discs 0 to 3 (106A to 106D) can be removed from the storage system 1 and can be kept in storage.

Although this embodiment uses the four ODDs 105A to 106D, this number is, of course, not a prerequisite of the embodiment and any plural number of the ODDs can be used. Similarly, the storage system in this embodiment can use a plurality of HDDs 107, some of which do not need to be inside the storage system, but can be externally connected. The nonvolatile memory 102 can be also divided into a plurality of parts, some of which do not need to be in the storage system, but can be externally connected.

When data and programs (hereinafter, simply referred to as "data"), which are stored in the optical discs 0 to 3 (106A to 106D), are reproduced for processing, the CPU 101 controls the storage controller 104 to initiate reproduction operations of the data. An ODD that received an instruction from the storage controller 104 reads out, for example, a piece of encrypted recorded data from the optical disc mounted therein, decrypts the encryption made at the time of recording and supplies the reproduced data to the storage controller 104.

The reproduced data supplied to the storage controller 104 is output from an output terminal 110 and supplied to the user. In a case where a display 3, such as an image monitor, is connected to the output terminal 110 as shown in FIG. 1 as an example, image information contained in the reproduced data is displayed. The display 3 can be used to display file systems which will be described later. Furthermore, the display 3 may be integrated in the storage system 1 rather than externally attached to the storage system 1.

Next, the method for generating a file system in the storage system, which is one of the features of the embodiment, will be described with reference to FIG. 2.

Figure 2:
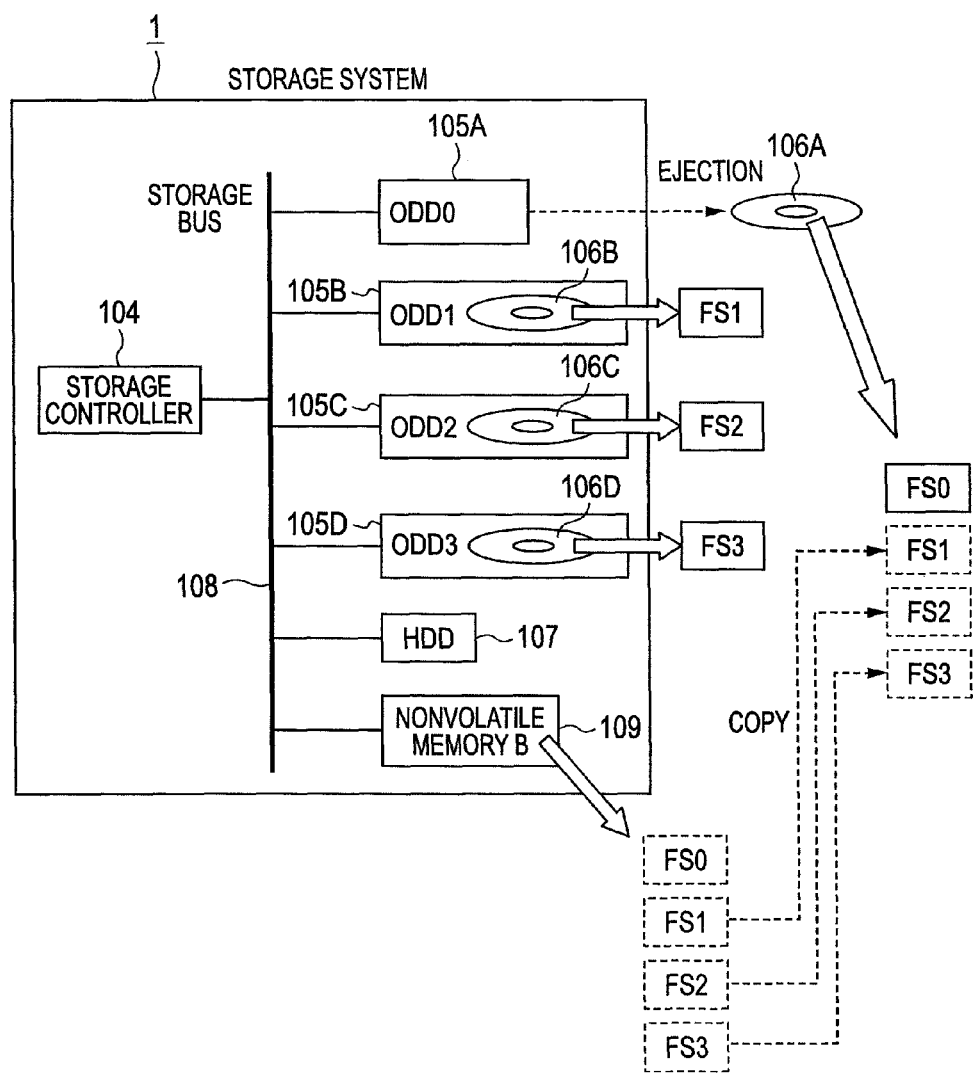
FIG. 2 is an illustration of a method for generating a file system according to the embodiment of the present invention.

FIG. 2 is an illustration of the method for generating a file system according to the embodiment of the present invention. The term file system indicates a file structure of the whole files stored in a recording medium. For example, folders, document files, program files and some other types of files are hierarchically arranged under a root in the storage system, and the folders and files can be seen on a PC (Personal Computer) display connected to the storage system. As will be described below, the file system is not the actual folders, document files or program files, but shows a hierarchical structure in the recording medium.

In the embodiment shown in FIG. 2, the optical discs 0 to 3 (106A to 106D) mounted in the ODDs 0 to 3 (105A to 105D) of the storage system 1 store, in addition to body data such as document files and program files, a file system of the data stored in themselves. For example, the optical disc 0 (106A) mounted in the ODD 0 (105A) stores a file system FS0 of data stored in itself, while the optical disc 1 (106B) mounted in the ODD 1 (105B) stores a file system FS1 of data stored in itself (similarly, the other optical discs stores file systems of their own data). Even if any one of the optical discs are removed from a specific storage system 1 and mounted into another storage system, the file system of the optical disc can be written on and read out from the optical disc, which features great versatility of the file system.

Another feature of the storage system in FIG. 2 is that a nonvolatile memory 109 connected to the ODDs 0 to 3 (105A to 105D) via the storage bus 108 stores copies of the file systems FS0 to FS3 of all optical discs mounted in the storage system 1 (file systems enclosed by dashed lines in FIG. 2 are file systems copied from the original optical discs). As shown with the optical disc 0 (106A) as an example, when the optical disc is removed (ejected) from the ODD, the optical disc stores not only its own file system FS0, but also copies of the other file systems FS1 to FS3, which are supplied from the nonvolatile memory 109, of the optical discs 1 to 3 (106B to 106D) mounted in the storage system 1. These operations are executed by the storage controller 104 that controls the ODD 0 (105A), HDD 107 and nonvolatile memory 109 via the storage bus 108.

The nonvolatile memory 109 may be an SDRAM or a large-capacity semiconductor memory called as an SSD (Solid State Drive). In addition, a removable memory, such as an SD card, is also applicable.

Alternatively, the copies of the file systems of all optical discs do not need to be stored in the nonvolatile memory 109, but can be stored in the HDD 107 or an HDD externally attached to the storage system 1. The nonvolatile memory 102 shown in FIG. 1 can be partially shared for the copies. It is also possible to define one of the optical discs mounted in the ODDs as a regularly-used master disc that stores all copies of the file systems of the other optical discs.

Figure 3A:
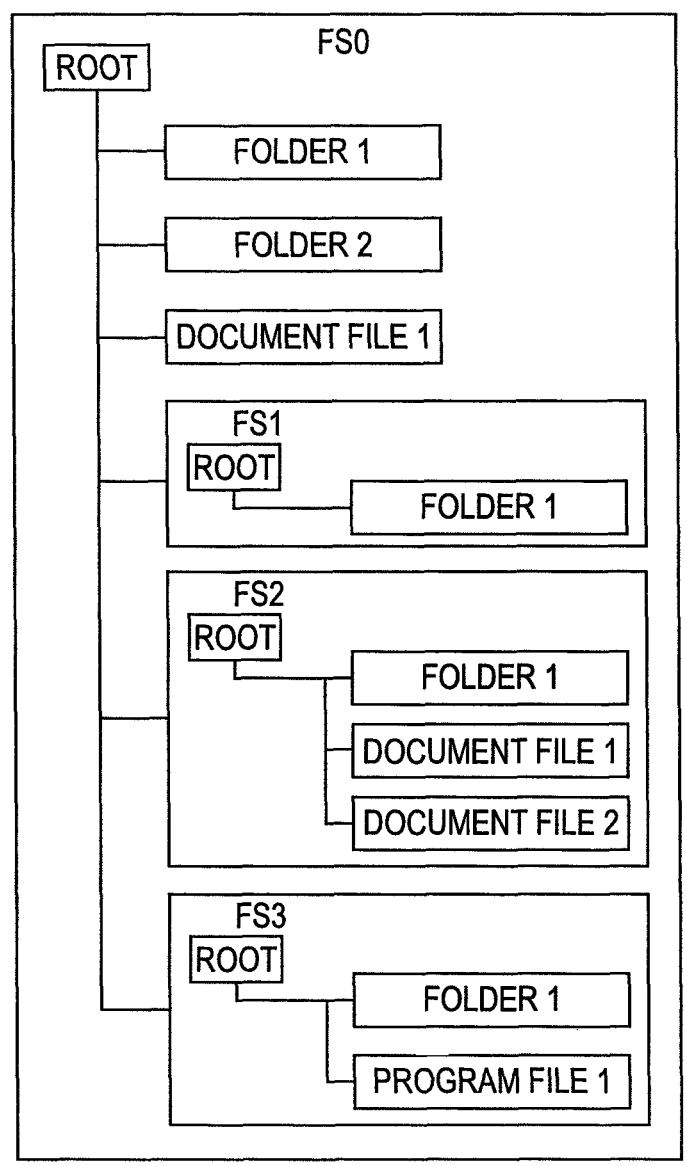
FIG. 3A is a diagram of a file system according to the embodiment of the present invention.
Figure 3B:
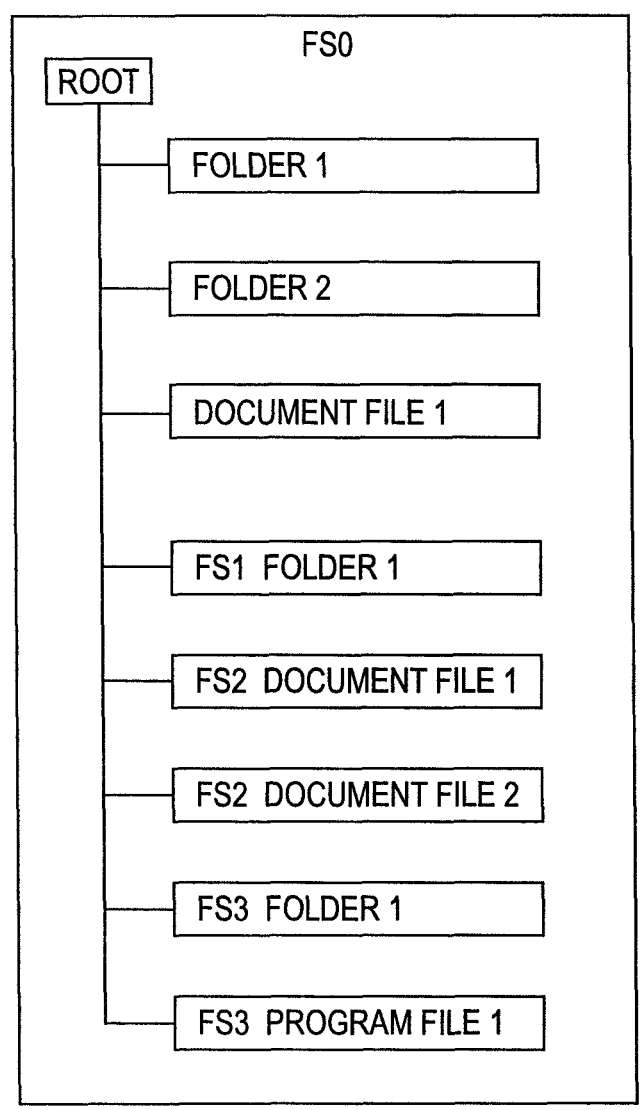
FIG. 3B is a diagram of another file system according to the embodiment of the present invention.

Prior to detailed descriptions about the features and effects of the embodiment in FIG. 2, the aforementioned file system will be further described using FIGS. 3A and 3B.

FIG. 3A is a diagram of a structure of the file system according to the embodiment of the present invention.

Although the file system as shown in FIG. 3A can be stored in the nonvolatile memory 109 or in an ejected optical disc, the file system in this description is assumed to be stored in an ejected optical disc (e.g., optical disc 0) as an example. The file systems FS0 to FS3 grouped by optical discs are independently subordinate to a root that organizes the entire file system. For instance, two folders 1 and 2, a document file 1 and the file systems FS1 to FS3 are subordinate to a root of the file system FS0, whereas a folder 1 and a program file 1 are subordinate to a root of the file system FS3. Generally, subfolders, document files, program files or other types of files belong to the lower level of the folders; however, FIG. 3, for the sake of brevity, shows only one level lower than the root of the file systems FS0 to FS3.

Namely, the file system is to represent a hierarchical structure of folders and files as shown on personal computer screens. Note that, for example, the document files in FIG. 3A do not include document data, but contain bibliographic item information including a file name, date and time created, data size, etc. This generally makes the file system small in data size.

In FIG. 3A, each of the file systems FS0 to FS3 is a special data file formed for each of the optical discs. Thus, when one of the optical discs is ejected, the copies of the file systems of the other optical discs transferred from the nonvolatile memory 109 to the ODD in which the ejected optical disc is mounted can be easily selected by analyzing the special data file.

FIG. 3B is a diagram of another structure of the file system according to the embodiment of the present invention.

The file system shown in FIG. 3B is an exemplary file system stored in an ejected optical disc (e.g., optical disc 0). The file system FS0 of the data stored in the optical disc is subordinate to a root that organizes the entire storage system. Two folders 1 and 2, a document file 1, which are originally stored in the optical disc 0, are subordinate to a root of the file system FS0. When the optical disc 0 is ejected from the storage system 1, the copies of the file systems of the other optical discs are also subordinate to the file system FS0. In other words, the file system FS0 serves as a special attribute file to merge with the copies of the file systems of the other optical discs. This merger can be done well by adding attribute information, as indicated by FS1 to FS3 in FIG. 3B, so as to facilitate determination of which file or folder relates to which optical disc.

The file system shown in FIG. 3B can be stored in the nonvolatile memory 109. In this case, attribute information of the file system FS0 may be added to folders and files relating to the optical disc 0. When any of the optical discs are removed from the storage system 1, the storage controller 104 selects files and folders associated with the other optical discs based on the attribute information, and sends copies of the file systems of the other optical discs to the ODDs in which the optical discs to be removed are mounted, and then the ODDs store the copies on the optical discs to be removed.

It can be said that either of the generated file systems in FIG. 3A and FIG. 3B is a virtual file system that makes a plurality of recording media look like a single recording medium.

As to an optical disc in which the aforementioned file system is stored, for example, when the file system is displayed on the display 3 in FIG. 1 in the form as shown in FIG. 3A or FIG. 3B, coloring parts relating to the optical disc with a unique color helps distinguish the parts from parts relating to the other optical discs, thereby making the file system user-friendly. Alternatively, the parts relating to the other optical discs may be set as hidden files so that users can opt not to display them.

The file system may include, in addition to the above-described bibliographic items, so-called metadata. For example, the metadata created with image data shot by a digital camera is contained in an Exif file and includes information about the model of the camera in use, the shooting data and time, the shutter speed, the aperture and so on. IFO files of DVDs and play lists and clip files of Blu-ray Discs are also categorized as a type of metadata. Due to their small capacity, these files have no significant problems with the file systems and actually improve the convenience of file retrieval.

On the other hand, if the file system includes free space management data (e.g., Space Bitmap), redundant data (e.g., Metadata Mirror File) that are associated with the other optical discs, it is preferable to delete the data from the file system. These data associated with the other optical discs are seldom used for the optical disc having the file system, but increase the volume of the file system, which is detrimental.

Next, the features and effects of the embodiment in FIG. 2 will be described in detail.

First of all, the file system stored in the optical discs is compatible with general systems, which realizes easy writing and reading of data, and therefore, is very versatile.

The file system stored in the nonvolatile memory 109 or an ejected optical disc is merged with all the file systems of the optical discs mounted in the storage system 1 so as to be treated as if they are a single file system in appearance. Thus, the user can manage the whole file systems as a single large-capacity recording medium without giving consideration to each of the optical discs mounted in the storage system 1. This improves the operability for retrieving a specific file. Even if the ejected optical disc is inserted into another storage system, file retrieval can be done in quite the same manner, thereby further improving operability.

All the file systems of the optical discs are merged and constructed in, for example, the nonvolatile memory 109 in the storage system. This allows the file systems of the other optical discs to be acquired from the memory upon ejection of a specific optical disc, which eliminates the necessity of sending inquiries to each optical disc. Therefore, access latency can be reduced. In the case of only reading, but not writing the file system, the file systems can be read out from the nonvolatile memory 109. Eliminating the need of reading out the file systems from every optical disc also reduces the access latency.

The file systems stored in the nonvolatile memory 109 are an accumulation of copies of the file systems of each of the optical discs. Therefore, the file system in the nonvolatile memory 109 does not need to be updated every time document file data is updated during editing of the document file on the HDD 107. It is enough for the file system to be updated at the least when any of the optical discs are ejected from the storage system 1, when data edited, for example, on the HDD 107 is transferred to and stored on an optical disc, or when the storage system 1 is powered off. This prevents overhead caused by frequent updates of the file system.

As described above, avoiding the storage of the free space management data and redundant data in the nonvolatile memory 109 results in effective use of the capacity of the nonvolatile memory 109 and reduces the amount of data transferred from the nonvolatile memory 109 to the ODD from which the optical disc is ejected, thereby enhancing operation speed.

Furthermore, as described above, the file system stored in the nonvolatile memory 109 is updated upon writing of data on any of the optical discs. In other words, the file system stored in the nonvolatile memory 109 and the file systems stored in each of the optical discs are concurrently updated to synchronize with each other. Thus, when a user refers to the file system to retrieve a file, rather than accessing individual optical discs, all the user has to do is look up the file system stored in the nonvolatile memory 109. This reduces time for file retrieval, thereby improving operability for the user.

As described above, generally, only the file system stored in the nonvolatile memory 109 is updated, while the file systems stored in the optical discs are updated only when any of the optical discs are ejected from the storage system 1, when data edited, for example, on the HDD 107 is transferred to and stored on an optical disc, or when the storage system 1 is powered off. This reduces the number of times the ODDs are accessed and the seek operations by the ODDs, resulting in enhanced access speed to the storage system 1.

In the case where the file system having the structure shown in FIG. 3A is applied, roots associated with IDs of the respective optical discs are subordinate to a root, and folders, document files and program files grouped by optical discs are subordinate to the roots. Each of the roots maintains the same folder structure as that seen when a user used the respective optical discs. Thus, the user can easily retrieve a file based on the user's memory of a past tree structure.

The storage system including a plurality of ODDs according to the aforementioned embodiment allows a user to easily retrieve a specific file from a plurality of optical discs, resulting in enhancement of the access speed and improvement in the operability of the storage system.

Although the above-described storage system is configured to, when a specific optical disc is ejected, transfer and store the copies of all the file systems in the nonvolatile memory 109 on the optical disc, the same storage system can employ a different operation mode in addition to the configuration. For example, storage of a large-capacity file is sometimes done by dividing the file into a plurality of files and storing them on a plurality of optical discs. In this case, storing only a file system associated with the file on only the optical discs onto which the divided files are stored may provide convenience. The storage system in this embodiment can be applied with such an operation mode in a switchable manner.

Next, the method for generating a file system for the storage system according to the embodiment will be described with reference to FIG. 4.

FIG. 4 is a flow chart showing the method for generating a file system according to the embodiment of the present invention.

With the storage system 1 activated with power supply, the flow starts.

At step S401, the storage controller 104 determines whether any of the optical discs currently mounted in the ODD 0 to ODD 3 (105A to 105D) are optical discs that have never been mounted therein in the past.

As a result of the determination at step S401, if the storage controller 104 determines that any of the optical discs are optical discs that have never been mounted in the ODD 0 to ODD 3 (105A to 105D) ("Yes" in FIG. 4), the storage controller 104 instructs the ODDs with the firstly-mounted optical discs to transfer copies of their own file systems stored in the optical discs to a nonvolatile memory 109. The nonvolatile memory 109 stores the transferred copies of the file systems in a storage area of its own. As a matter of course, the nonvolatile memory 109 keeps all copies of the file systems of the optical discs that have been mounted in the storage system 1 until being instructed to delete them.

Subsequently, the flow proceeds from step S402 to step S403. In addition, as a result of the determination at step S401, if it is determined that none of the optical discs currently mounted in the ODD 0 to ODD 3 (105A to 105D) is an optical disc that has never been mounted therein in the past ("No" in FIG. 4), the flow proceeds from step S401 to step S403.

At step S403, the storage controller 104 determines whether any of the optical discs mounted in the ODD 0 to ODD 3 (105A to 105D) have been updated.

As a result of the determination at step S403, if it is determined that any of the optical discs mounted in the ODD 0 to ODD 3 (105A to 105D) have been updated ("Yes" in FIG. 4), the storage controller 104 instructs the ODDs with the updated optical discs mounted to transfer copies of their own updated file systems stored in the updated optical discs to the nonvolatile memory 109 at step S404. The nonvolatile memory 109 updates itself to store the transferred copies of the file systems in a storage area of its own.

Subsequently, the flow proceeds from step S404 to step S405. In addition, as a result of the determination step S403, if it is determined that none of the optical discs mounted in the ODD 0 to ODD3 (105A to 105D) has been updated ("No" in FIG. 4), the flow proceeds from step S403 to step S405.

At step S405, the storage controller 104 determines whether any of the optical discs mounted in the ODD 0 to ODD 3 (105A to 105D) have been instructed to eject from the storage system 1.

As a result of the determination at step S405, if it is determined that any of the optical discs mounted in the ODD 0 to ODD 3 (105A to 105D) have been instructed to eject from the storage system 1 ("Yes" in FIG. 4), the storage controller 104 instructs the ODDs with the to-be-ejected optical discs mounted to transfer copies of their own file systems stored in the optical discs to the nonvolatile memory 109 at step S406. The nonvolatile memory 109 updates itself to store the transferred copies of the file systems in a storage area of its own. In addition, the storage controller 104 instructs the nonvolatile memory 109 to transfer the copies of the self-stored file systems of the other optical discs to the ODDs with the to-be ejected optical discs mounted. The ODDs store the transferred copies of the file systems of the other optical discs on the to-be ejected optical discs and ejects the optical discs from the storage system 1.

Subsequently, the flow proceeds from step S406 to step 407. In addition, as a result of the determination step S405, is it is determined that none of the optical discs mounted in the ODD 0 to ODD 3 (105A to 105D) has been instructed to eject from the storage system 1 ("No" in FIG. 4), the flow proceeds from step S405 to step S407.

At step S407, the storage controller 104 determines whether it has received an instruction from the CPU 101 to power off the storage system 1.

As a result of the determination at step S407, if it is determined that the storage controller 104 has received the instruction to power off the storage system ("Yes" in FIG. 4), the storage controller 104 instructs the ODD 0 to ODD 3 (105A to 105D) to transfer the copies of their own file systems stored in the optical discs mounted therein to the nonvolatile memory 109 at step S408. The nonvolatile memory 109 updates itself to store the transferred copies of the file systems in a storage area of its own. Subsequently, the flow is terminated with the power-off.

As a result of the determination at step S407, if it is determined that the storage controller 104 has not received the instruction to power off the storage system ("No" in FIG. 4), the flow returns to step S401 to repeat the flow.

Although the steps S403, S405 and S407 are arranged in series for convenience of explanation, this is just an example, and these steps can be arranged in parallel under step S402, for example.

The aforementioned embodiment is merely an example and is not to be limitative of the scope of the present invention. For example, the optical discs are used as removable recording media in the description; however, the present invention is also applicable to storage systems using removable media such as an SSD and HDD. Various other different embodiments along the spirit of the present invention are conceivable and those are all within the scope of the present invention.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:
1. A storage system comprising:
a plurality of recording medium drives that store file systems on recording media mounted therein, the file systems representing a storage structure of files stored at least on the recording media, wherein:
the storage system includes virtual file systems based on copies of all the file systems stored in the recording media mounted in the recording medium drives, the recording media are removable from the recording medium drives, and when any of the removable recording media are ejected from the recording medium drives, copies of the virtual file systems associated with the recording media other than the virtual file systems of the recording media to be ejected are stored in the recording media to be ejected.

2. The storage system according to claim 1, further comprising a nonvolatile memory that stores the virtual file systems.

3. The storage system according to claim 1, wherein when any of the removable recording media are ejected from the recording medium drives, the virtual file systems associated with the recording media to be ejected among the virtual file systems are updated with copies of the file systems associated with and stored in the recording media to be ejected.

4. The storage system according to claim 1, wherein when the ejected recording media are again mounted in the storage system and their file systems are reproduced and output for display, the file systems are output with copies of the virtual file systems associated with the recording media other than the recording media mounted again.

5. The storage system according to claim 1, wherein the virtual file systems are file systems independent of one another according to the recording media mounted in the storage system.

6. The storage system according to claim 1, wherein the virtual file systems have the same structure as the file systems stored in the recording media mounted in the storage system.

* * * * *